Nov. 12, 1929. S. S. WRIGHTSON ET AL 1,735,194
FISHPLATE FOR RAILWAYS OR TRAMWAYS
Filed Nov. 19, 1928
Fig. 1.
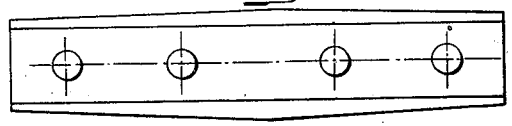
Fig. 2.
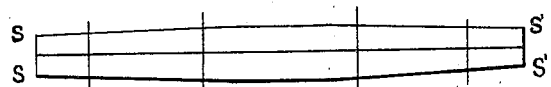
Fig. 3.
Fig. 4
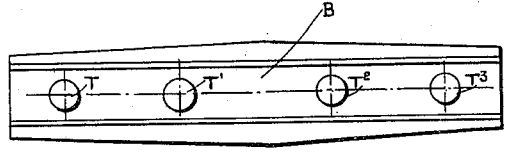
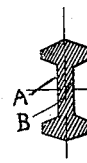
Fig. 5.
Fig. 6.
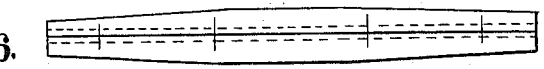
Fig. 7.
Fig. 8.
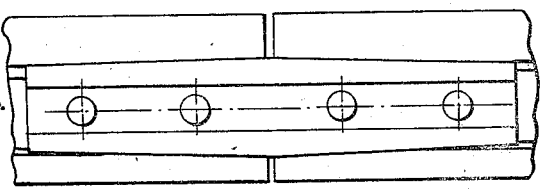
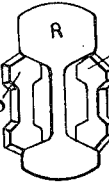
Fig. 9.
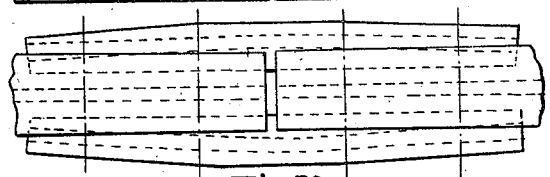
Fig. 10.
Inventors
Samuel Summerson Wrightson
and
Charles Richard Matthews
By B. Singer, Atty.

Patented Nov. 12, 1929

1,735,194

UNITED STATES PATENT OFFICE

SAMUEL SUMMERSON WRIGHTSON AND CHARLES RICHARD MATTHEWS, OF ALBERT HILL, ENGLAND

FISHPLATE FOR RAILWAYS OR TRAMWAYS

Application filed November 19, 1928, Serial No. 320,469, and in Great Britain March 1, 1928.

Our invention relates to fishplates used for connecting the ends of railway and tramway rails, and has for its object the better securing of the ends of the rails than at present exists with fishplates in ordinary use; and a means whereby wear or abrasion of the fishing surfaces at the rail ends can be largely eliminated and the life of the fishplate can be doubled.

There are many forms of railway and tramway fishplates in existence, but as far as our knowledge goes all of them are provided with fishing surfaces, on one side of the plate only which fishing surfaces come into parallel contact with the fishing surfaces at the ends of the rails. The object of our invention is to provide a fishplate with a symmetrical cross section and curved fishing surfaces so that when a pair of fishplates is bolted up into position the bolts will pull or tend to pull straight the fishing surfaces adjacent to the rail, and in so doing an intense pressure will take place on those portions of the fishing surfaces which are immediately adjacent to the ends of the rails, thereby preventing the ends of the two rails moving in relation to one another and thus obviating rail end destruction which is a source of trouble to railway and tramway engineers. Further, fishplates made to our design are reversible so that the life of the fishplate can be doubled and also the fishing surfaces can be so designed as to take up wear when a fishplate is reversed.

In the accompanying drawings Figs. 1, 2 and 3 are an elevation, cross section and plan respectively of a reversible fishplate of fishbelly form.

Figs. 4, 5 and 6 are an elevation, cross section and plan respectively of a fishbelly fishplate made from bar of symmetrical cross section with the material massed at the top and bottom of the bar.

Fig. 7 is a symmetrical cross section of fishplate with the material massed at the top and bottom of the bar but with a thickening on one pair of fishing surfaces.

Figs. 8, 9 and 10 are a side elevation, end elevation and plan respectively of a pair of fishplates bolted in position to a bullhead rail, one of the fishplates being of symmetrical section and the other being of non-symmetrical section, the latter to allow for large wheel clearances.

As fishplates are generally made from some form of steel it is an easy matter to heat treat, harden or temper the material so that any curvatures which have been put into the plates can be regarded for all practical purposes as permanent settings, so that after a pair of fishplates have been bolted into position and then released, the curvatures, although straightened out when under the action of the bolts, will resume their initial manufactured form.

One means of achieving our object is to provide a fishplate of symmetrical cross section as shown in Fig. 2, with a curved or bent fishing surface S, S¹ on each longitudinal side, as shown in Fig. 3, the elevation assuming the shape shown in Fig. 1. The fishplate is heat treated, hardened or tempered as before described so that when a pair of fishplates is bolted into position the bolts at the extremities of the fishplates will pull or tend to pull straight the pair of fishing surfaces adjacent to the rails, and in so doing an intense pressure will take place on those portions of the fishing surfaces which are immediately adjacent to the ends of the rails as before described.

Another means of achieving our object is to provide a fishplate with a cross section as shown in Fig. 5, in which the material is massed at the top and bottom of the fishplate with a minimum amount of connecting web B on or about the neutral axis A, the bolts for securing the fishplates passing through the aforementioned web B as shown at T, T¹, T², T³, in Fig. 4. The section of the fishplate is symmetrical about a given centre line as shown in Fig. 5, the actual form of the section in no way influencing our invention. The longitudinal surfaces are so curved or bent that a plan of a fishplate may in form be a fishbelly as shown in Fig. 6. When a fishbelly fishplate is bolted into position at the ends of the rails it assumes the form as shown in Figs. 8 and 10. Again, the fishplate is heat treated, hardened or tempered in order that it may regain its manufactured form after being bolted in position and then released, as before described.

If the metal on the fishing surfaces is increased on one side of the vertical centre line, as indicated at F, $F^1$ in Fig. 7, then when the fishplate is reversed wear of the rail end fishing surfaces can be taken up. The inside fishplate can be of a non-symmetrical section so as to allow for large wheel flange clearances as indicated at E in Fig. 9, where "R" is a section of the running rail and "D" is a companion symmetrical fishplate.

Fishplates of our design can be made from either rolled, cast or milled steel, or from other suitable material, and can be drilled for any form of bolt fastening and secured by any of the methods adopted for ordinary fishplates.

What we claim and desire to secure by Letters Patent of the United States is:—

1. A fishplate which is formed with its sides or fishing surfaces longitudinally curved or convexed and which is spring tempered so that when a pair of such fishplates is bolted up into position, the bolts at the extremities of the fishplates will tend to straighten out the curved surfaces, and when the said bolts are released the curvatures will resume their initial manufactured form.

2. A fishplate according to claim 1, in which the material is massed at the top and bottom of the fishplate with a minimum amount of connecting web on or about the neutral axis.

3. A fishplate according to claim 1, wherein the cross section is unsymmetrical, the material being massed at the top and bottom of the fishplate, and in which one of the longitudinally curved or convexed sides is cut away for the purpose of allowing large wheel flange clearance.

4. A fishplate according to claim 1, in which the material on the fishing surfaces is increased on one side of the vertical center line to compensate for wear when the fishplate is reversed.

In witness whereof we affix our signatures.

SAMUEL SUMMERSON WRIGHTSON.
CHARLES RICHARD MATTHEWS.